US008589529B2

(12) United States Patent
Siegel et al.

(10) Patent No.: US 8,589,529 B2
(45) Date of Patent: *Nov. 19, 2013

(54) METHODS AND APPARATUS FOR USER PERSONA MANAGEMENT

(71) Applicant: AT&T Intellectual Property II, LP, Atlanta, GA (US)

(72) Inventors: Steven A. Siegel, Mendham, NJ (US); Siroos K. Afshar, Englishtown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/785,815

(22) Filed: Mar. 5, 2013

(65) Prior Publication Data

US 2013/0185442 A1 Jul. 18, 2013

Related U.S. Application Data

(63) Continuation of application No. 11/960,816, filed on Dec. 20, 2007, now Pat. No. 8,429,260.

(51) Int. Cl.
  *G06F 15/16* (2006.01)
(52) U.S. Cl.
  USPC .......................................... 709/223; 709/227
(58) Field of Classification Search
  USPC .................................. 709/201–203, 223, 227
  See application file for complete search history.

(56) References Cited

U.S. PATENT DOCUMENTS

| 6,477,374 | B1 | 11/2002 | Shaffer |
| 2004/0022369 | A1 | 2/2004 | Vitikainen |
| 2004/0266408 | A1 | 12/2004 | Maes |
| 2007/0076691 | A1 | 4/2007 | Varney |
| 2007/0121890 | A1* | 5/2007 | Li et al. ..................... 379/221.13 |
| 2007/0225984 | A1* | 9/2007 | Milstein et al. ............... 704/270 |
| 2007/0297419 | A1 | 12/2007 | Askerup |
| 2009/0006533 | A1* | 1/2009 | Guo .............................. 709/203 |

* cited by examiner

*Primary Examiner* — Thai Nguyen
(74) *Attorney, Agent, or Firm* — Guntin & Gust, PLC; Douglas Schnabel (57) ABSTRACT

Systems and techniques for managing a user persona presented in a communication session. In response to a request from an originating user for a communication session, a persona manager for the originating user is invoked, examining request details and the nature and context of the requested communication session and selecting a persona for the user, selection of the persona being employed to indicate services associated with the communication. Similarly, in response to a request from an originating user for a communication session, a persona manager for the receiving user to whom the request is directed examines details of the request and the nature and context of the communication session and makes decisions relating to persona selection for the receiving user. The decision may involve accepting a persona indicated in the originating user's request, or selecting a different persona and creating routing a request to be routed to the receiving user.

18 Claims, 4 Drawing Sheets

FIG. 1

METHODS AND APPARATUS FOR USER PERSONA MANAGEMENT

CROSS-REFERENCE TO RELATED APPLICATIONS

This application is a continuation of and claims priority to U.S. patent application Ser. No. 11/960,816 filed Dec. 20, 2007 which is incorporated herein by reference in its entirety.

FIELD OF THE DISCLOSURE

The present invention relates generally to improvements to data communication. More particularly, the invention relates to improved systems and techniques for managing a persona presented by a user during a communication session, with the persona being selected based on automated analysis of characteristics related to the nature and context of the communication session.

BACKGROUND OF THE DISCLOSURE

The use of communication services, such as land and cellular telephony, text messaging, text, voice, and video instant messaging, and a host of other services, is of central and growing importance in the lives of many people, with many users of communication services taking on numerous different roles and employing many different communication devices and services in their day to day activities. Users may see themselves as acting in different roles in their different communications. These different roles involve interactions with different groups of people and often involve the use of different combinations of services commensurate with the different roles in which the users see themselves as acting.

It is advantageous to users to have flexibility in their communications, and it is highly desirable for service providers to afford users a wide range of services, without a need for a user to go to different providers for different services. Many providers therefore allow users to associate combinations of services with different service profiles, with a number of different service profiles being associated with a single user. A user may receive services from a provider through different devices, such as a landline telephone, a cellular telephone, a personal digital assistant, a computer, a set top box, and numerous other devices, and may establish communication sessions with other users through any of a number of devices.

Among its several aspects, the present invention recognizes the need for convenient and flexible selection of user personas to allow a user to operate in an appropriate role in a particular communication session with little or no regard for the particular mechanisms used to engage in the session. Modern users see themselves as engaging in interactions based on their needs at the time, and do not see themselves as operating in roles based on the equipment they happen to be using. In addition, users prefer to minimize the complexity of their interactions. For example, it is highly desirable to a user to deal with only a limited number of user IDs, or even only one user ID. At the same time, the user may wish to have access to a number of different services or sets of services that are selected based on an identity that the user wishes to assert for a particular interaction, and may wish that the choice of which identity to assert be made in a way that is relatively transparent to the user.

To address these issues, as well as others, a communication system according to an aspect of the present invention provides a persona manager used to analyze information and context surrounding a communication session and select a user persona based on the analysis. The user persona is suitably asserted in the form of a public user identifier (PUID) and the persona manager examines the circumstances of the initiation of a communication session and changes the PUID employed for the session as appropriate. A PUID is typically associated with a set of services to be employed or made available in the session.

A system stores a user profile for a user, associated with one or more PUIDs. Each PUID is associated with a service profile, which defines the services to be invoked in which the service profile is used, that is, in sessions in which the PUID associated with the service profile is asserted.

On many occasions, it may be desirable for a user to assert a particular PUID that may not necessarily be the default PUID associated with a particular mechanism for beginning a session. For example, a user device may be associated by default with a particular PUID. For example, the user's landline telephone may have a particular default PUID associated with it, so that making a call using the landline telephone may default to assertion of that PUID. To take another example, a shared landline telephone may assert a group PUID by default, but a particular user may be better served if an individual PUID for the user is asserted, and the circumstances under which the call is made, such as the date, time of day, or party being called, may provide insight into which PUID is appropriate.

Different PUIDs, as noted above, are associated with different service profiles, and the different PUIDs may suitably be associated with sets of services that are more suited to be invoked in one context or another. For example, one PUID might be associated with services suited to the user's work activities, and another PUID might be associated with services suited to the user's school activities. A user might wish to assert a different PUID from the default PUID, but it might not be convenient for the user to explicitly make such a choice, or the equipment that the user happens to be using for the session may not allow for convenient changing of the PUID.

In addition, a user receiving a call may wish for a different PUID to be asserted than that specified in the originating request, which typically includes the PUID for the originator and the PUID for the receiving user. The receiving user may wish to change treatment for a particular user, or may otherwise wish to change the service profile used in a communication from that associated with the PUID used in the request, and may find it convenient for this change to be accomplished automatically.

To this end, a communication system according to an aspect of the present invention provides for a persona manager, capable of selecting a user persona to be asserted in a session. The user persona selection is typically achieved by selecting the PUID to be asserted in the session, either by allowing a default PUID to be asserted or by changing the asserted PUID to another PUID, with the selection being made based on information useful for such selection, for example, information about the location of the user, time of day, originating user, receiving user, and other information indicating the context of a communication session. The communication system maintains one or more number of user profiles for each user, with each user profile being associated with one or more PUIDs. Each PUID is associated with a service profile and the service profile associated with a PUID determines which services are to be invoked during a communication session initiated using the PUID associated with the service profile.

When a communication session is initiated, the persona manager is invoked. The persona manager receives information associated with the initiation of the communication session, such as the PUID associated by default with equipment used to initiate the session, identification of a receiving user, such as a PUID for the receiving user included in the request to begin the session, as well as additional information, such as information related to the context in which the communication session is being conducted. For example, the time of day may be relevant to whether the student, work, or home persona for a user is to be invoked, the location from which the call is being made may be relevant to whether a leisure trip, business trip, home, or work persona is to be invoked, the party being called may be relevant to whether a work, home, student, known person, or stranger persona is to be invoked, to take a number of examples. Information may be obtained from any appropriate source from which it is available, such as the header of a session origination request, stored information or other information indicating the nature of the session, interactions with the user, or other sources. The persona manager selects the appropriate persona, suitably using a set of rules used to analyze the various information elements surrounding the communication session. The appropriate persona is selected, and a new origination request may be generated or the current request may be modified, asserting the PUID chosen by the persona manager for the session, so as to request that specified application servers provide the services to be invoked for the session. A further request is then generated, asserting the appropriate PUID and the services to be invoked.

A more complete understanding of the present invention, as well as further features and advantages of the invention, will be apparent from the following Detailed Description and the accompanying drawings.

DETAILED DESCRIPTION OF THE DRAWINGS

Figure 1:
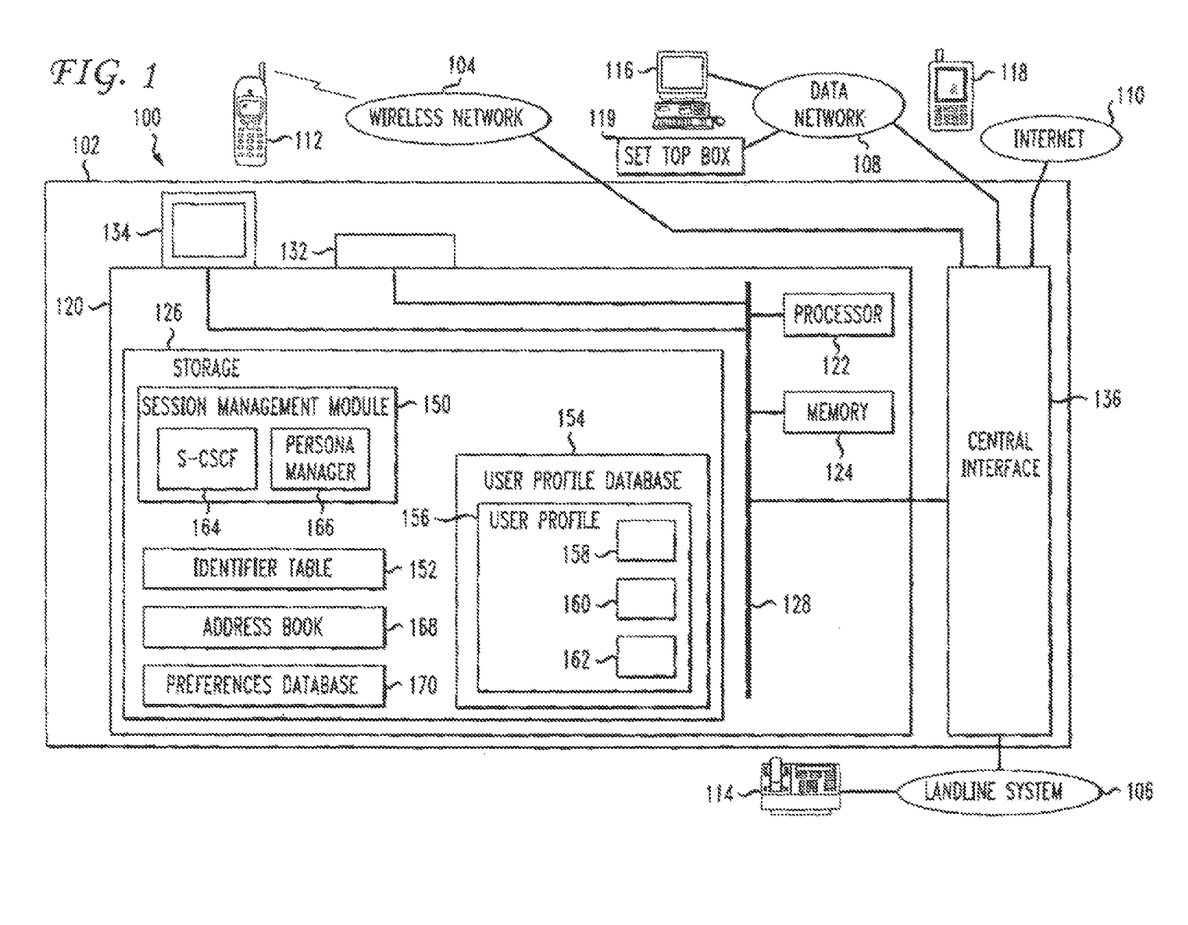
FIG. 1 illustrates a communication system according to an aspect of the present invention.

FIG. 1 illustrates a communication system 100 according to an aspect of the present invention. The exemplary system 100 illustrated here includes a central facility 102 for managing user information, receiving session initiation requests, identifying the user or equipment indicated by the request, assembling services to be provided for the communication session, and establishing connection with user devices. The system 100 suitably includes a wireless telephone network 104, a landline telephone system 106, a data network 108 suitably providing data services, suitably including packet switched services and including access to the Internet 110, and also suitably including telephony services such as voice over IP. The Internet 110 may be accessible to users both through the data network 108 and through the landline telephone network 106 and the wireless telephone network 104. Various user devices, such as a wireless telephone 112, a landline telephone 114, a computer 116, a wireless data communication device 118, a set top box 119, and other devices, are suitably included in and served by the system 100. While for ease of illustration one wireless telephone 112, one landline telephone 114, one computer 116 and one wireless data communication device 118 are illustrated in the drawings, such devices and other elements are intended to be representative of the large numbers of elements that are found in typical networks today and are to be found in networks of the future. It will also be recognized that while in the exemplary system presented here, separate networks and devices providing and receiving distinct services are illustrated, both networks and devices may fill multiple roles. For example, a device may provide combined wireless telephone and data services, served by a single network providing both telephony and data services, as well as access to the Internet 110.

The central facility 102 suitably includes a central server 120, including a processor 122, memory 124, storage 126, communicating over a bus 128 with one another and with a keyboard 132 and display 134. The central server 120 also communicates with a central interface 136, in order to control the various networks such as the networks 104, 106, and 108 and to manage communications over these networks. A single server 120 is illustrated here for simplicity, but it will be recognized that a large system may employ many servers, each of which may provide a subset of the functionality described here, to handle various processing loads and that these servers may be distributed over a wide geographic area, with traffic and requests being directed from various users to appropriate servers to meet user needs.

The central server 120 hosts a session management module 150, suitably implemented as software hosted in storage 126 and transferred to memory 124 as needed for execution by the processor 122. The session management module 150 receives session initiation requests, identifies the user or equipment that is the subject of the request, and takes the steps needed to establish a communication session with the user or equipment. The session management module 150 has access to various collections of information, such as an identifier table 152, associating an identifier such as a public user identifier (PUID) with the target of a communication session request invoked using the identifier. The PUID identifies a user, and a call session control process that takes place to initiate a communication session associates the PUID with the address of a device, that association having previously been made by a registration process. The identifier table 152 suitably associates user PUIDs with devices with which the PUIDs are associated through registration. In the case of a shared device, such as a landline telephone shared by family members, the default PUID for the telephone may be a group PUID that does not identify the particular user making a call. However, the table 152 may include multiple devices that are associated with a PUID, multiple PUIDs that are associated with the telephone, with a number of the multiple PUIDs identifying a specific user, and with different PUIDs being associated with different service profiles.

The session management module 150 also has access to a user profile database 154, which stores information relating to each user in a profile for that user. The user profile database 154 will typically include a large or very large number of user profiles, but in the interests of simplicity only the user profile 156 is illustrated here. The user profile 156 includes one or more PUIDs associated with the user, as well as information identifying addresses and services associated with the user. The user profile may include a student PUID 158, a work PUID 160, and a home or default PUID 162. Each PUID is associated with a service profile defining a set of services to be invoked for communication sessions, for example, by defining conditions under which specific servers are invoked for a session. Service profiles may, for, example, define services appropriate for business travel, for leisure travel, for home, for work, and for various other circumstances, such as communications with a specific group of close friends, or with known or unknown persons at work or at home.

In order to provide a high level of convenience and functionality for a user, the system 100, to the extent possible, adapts communication sessions with a user to the role in which the user is acting. To this end, the session management module 150 implements a serving-call session control function (S-CSCF) 164 for the user. An S-CSCF such as the S-CSCF 164 manages establishment of communication sessions, conveniently referred to here as calls, for which the user with which it is associated is the originating user or the receiving, or terminating, user. It will be recognized that any number of possible communication sessions are contemplated here, such as telephone calls, instant messaging sessions, data sessions, and other forms of communication sessions. One exemplary additional form of communication session is the selection and delivery of entertainment and information, such as selection and delivery of video programming accomplished through the set top box 119 and interaction by or through the set top box with the data network 108 or another network delivering entertainment to customers. It will be recognized that the exact form of the communication session is not necessarily established until initiation has been completed. The S-CSCF 164 uses a persona manager 166 to select the persona to be used in the call, and the S-CSCF 164 uses the persona to select the service profile to be used for the call.

When the user initiates a call, he or she uses a device to make contact with the system 100. The device generates an invite, including a uniform resource identifier (URI) serving to identify its network address itself. The invite also includes a public user identifier (PUID) for the user, which is asserted by the device, selected by the user, or selected as the invite is processed. The information in the invite is used to identify and invoke the S-CSCF 164 associated with the user. A plurality of PUIDs may be associated with each user, but each PUID associated with a user may suitably invoke the same S-CSCF, in this case, the S-CSCF 164.

When initiating an originating call, the S-CSCF 164 may suitably use the persona manager 166 to select a persona for the originating user, and when initiating a received call, the S-CSCF 164 may suitably use the persona manager 166 to select a persona for the user receiving the call. If the call comes from suitable equipment, the originating user may simply select a persona, in which case the S-CSCF 164 may treat the selection according to previously made rules for managing such selections, for example, overriding any alternative selection that might otherwise be made, or, sending the invite to the persona manager 166 to determine whether to override the selection. If the equipment used to make the call does not allow for explicit selection of a persona by a user, or if the user does not explicitly select a persona, the persona manager 166 suitably performs analysis of the nature of the call and the context in which the call is made in order to select the proper persona. This selection is made by choosing an appropriate PUID to be used for the call.

For example, an invite may include a default PUID associated with the device used to make the call, and additional information that may be used to identify the context of the communication, such as time of day. The invite will also typically include a PUID for the receiving user, and this information will often be useful for determining which persona is to be invoked, and which PUID is to be selected. Numerous pieces of information may be available in various resources in the system 100 for determining the appropriate PUID to be used. This may include the asserted identity PUID in a header of the request to establish a session, the recipient PUID, and information from various databases or elements in the system 100, such as location servers indicating the location of the originator of the call, or presence servers indicating whether the recipient of a call is "present" on the system 100 or a system that can be contacted using the system 100, for example, if the recipient of the call is logged into his or her instant messaging client. Other information might be available in an enabler application used by the S-CSCF 164, directly or indirectly through another component, to originate the call, such as an address book 168. Other useful information includes date and time. Numerous other elements of information can be analyzed, with all information being analyzed according to rules directed toward meeting the needs of the user. Such rules might be developed in numerous ways, such as through explicit selections by the user including interactive session in which the user is presented with choices and makes selections to indicate preferences.

If an explicit selection by a user has not been made for a specific PUID to be asserted for the session, the persona manager 166 may analyze available information such as information of the types described above to identify the persona to be selected. In the case of the address book 168, for example, the user being called may be identified as a work colleague or as a fellow student, giving rise to the selection of the work persona or the student persona, as appropriate. The rules and preferences employed by the persona manager 166 are suitably stored in a preference database 170. Once the proper persona is selected, the S-CSCF 164 uses information provided by the persona to select the services to be used in the communication session.

The persona manager 166 can operate in a generally similar way to select a persona to be employed when the user with which it is associated is the receiving user. An invite includes information identifying the originating user, as well as information that can be used to identify the receiving user. For example, an invite may include a PUID associated with the receiving user. A single user may have a number of associated PUIDs, and the PUID included in the request may influence the persona to be used. However, it may be appropriate to override an originating user's selection of a persona to be employed by the receiving user. The persona manager 166 is therefore influenced by the selection indicated by the invite, but is not necessarily controlled by it, and may make appropriate changes in order to cause selection of the appropriate persona, such as selecting a user's work profile to respond to an invite directed to a PUID associated with a user's personal profile.

The S-CSCF 164 is typically invoked by an invite, which is a request to begin a communication session. The invite identifies a user or device initiating the request, and also identifies the user or device to which the request is directed. The invite may be interpreted by the S-CSCF 164 to determine whether the persona manager 166 is to be invoked. For example, a device used to initiate the invite may be incapable of making a user selection, and may have an associated preference to invoke the persona manager 166 to determine which persona is to be used. On the other hand, if a device initiates an invite that includes a persona selection, it may not be necessary for the S-CSCF 164 to invoke the persona manager 166.

When invoked, the persona manager 166 employs information provided by the URI or PUID in the invite, and information provided by enabler applications such as the address book 168, as well as information provided by the preference database 170. Frequently, if a user has multiple PUIDs, the PUID by which a user is addressed will determine or influence the persona to be used. For example, the user's work telephone may by default invoke the work PUID of the user. The persona manager 166 operates by receiving and examining invites and performing operations on the invites based on relevant information and rules, as can be seen in the examples discussed below.

Figure 2:
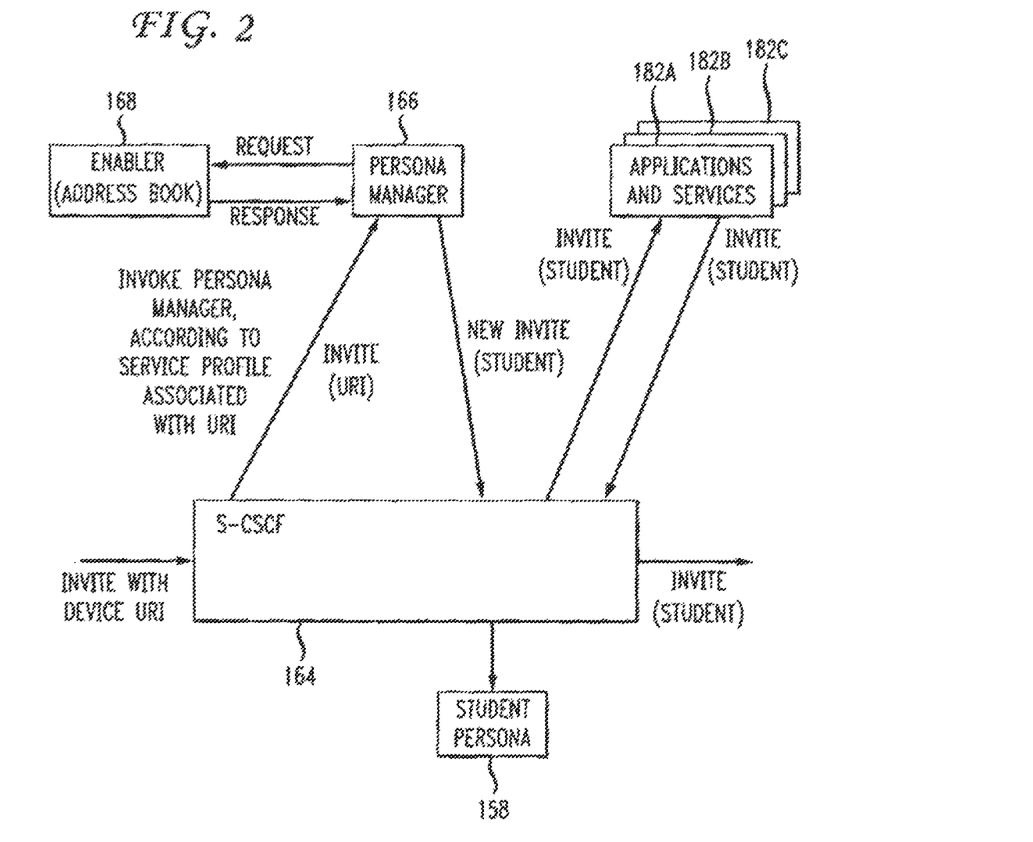
FIGS. 2 and 3 illustrate operational elements and procedures followed by those elements in selecting a persona and initiating a communication according to an aspect of the present invention.

FIG. 2 is a symbolic representation of the S-CSCF 164, the persona manager 166, and additional elements, illustrating exemplary operation of the S-CSCF 164 and persona manager 166 in selecting a persona for an originating user. The S-CSCF 164 receives an invite directed from the user's telephone. The invite includes a default PUID associated with the telephone. The reason for this may be that the particular device used does not support explicit user designation of a PUID, for example, in the case of a legacy telephone in which the telephone number is used to create a PUID. The system 100 uses the default PUID associated with the telephone to identify the associated user, and invokes the S-CSCF 164 associated with the user. Typically, a service profile is associated with a PUID, indicating actions to be taken to initiate a communication session. In the present exemplary case, the service profile associated with the URI indicates that the persona manager 166 must be invoked to select the persona. The service profile suitably comprises a hierarchy of initial filter criteria (iFC) indicating how an invite from the device or PUID associated with the profile is to be handled, with the highest priority iFC whose conditions are met being the iFC used. In the present exemplary case, the highest priority in the profile associated with the default PUID indicates that all calls from the URI should be sent to the persona manager. The S-CSCF 164 thus passes an invite to the persona manager 166. When the persona manager receives the invite, it may consult the database 170, as well as enabler applications and other information, to determine the persona that is to be invoked.

In the present exemplary case, suppose that the user has indicated that calls to destinations at the user's university are to be handled using the student persona, and that the invite is directed to a destination at that university. In this case, the persona manager 166 creates a new invite, or modifies the existing invite, and relays the new or modified invite to the S-CSCF 164. The persona manager 166 may, for example, be directed by a stored rule that calls directed to the university destination are to assert an identity, such as a PUID, associated with the user's status as a student. This determination may be made, for example, based on examination of an enabler application such as the address book 168.

The persona manager 166 creates or modifies the invite with an appropriate PUID in the header, and passes this invite to the S-CSCF 164. When the S-CSCF 164 receives an invite back from a function or application, it normally continues processing the next highest priority initial filter criteria in the same service profile, in this case, the profile associated with the telephone. The S-CSCF 164 uses the way it addresses itself in the route header field to indicate its status at the point of processing the initial filter criteria. The persona manager 166 forces the S-CSCF 164 to treat the returned invite as a new invite including a new PUID and therefore associated with a new service profile by acting as a session initiation protocol (SIP) back to back user agent. This operation is done by creating a new message with the new asserted identity, but without the information in the header that instructs the S-CSCF 164 to continue processing the old service profile.

When the new invite is received by the S-CSCF 164, the service profile for the student persona is used. The S-CSCF 164 processes the invite based on the student persona, invoking the applications and services 182A-182C associated with the student persona 158, and transmits an appropriately formatted invite for routing to the destination.

As noted above, the persona manager 166 is not restricted to using information in the message header to determine which persona should be used. Other variables could be used such as time of day, day of week, or the like. For example, during work hours the user may wish all calls from his work telephone to use his work persona. Outside of work hours, even if the work telephone is used, a different persona may be desired.

Alternatively, instead of using data in the SIP message or using information available locally to the persona manager 166, the persona manager 166 could use data in an enabler application to determine which persona to use. For example, an enabler application might provide for the user to establish rules indicating which persona will be used on calls from a specific telephone, storing these rules in the preferences database 170.

The telephone might have an associated default PUID indicating that the database 170 should be examined. Thus, on calls from this telephone, the persona manager 166 will use rules and information from the preference database 170. Another approach could be to use a location enabler, for example, in the case of use of a cellular telephone. The work persona could be invoked when the user's cell phone is near his work location and the student persona when it is near the school campus, for example.

When the user under consideration is the receiving user, establishment of a communication session, or call, is treated similarly to the establishment of a call for an originating user. In the case of a call for a receiving user, however, the processing is triggered by the contents of the request URI as received at the terminating S-CSCF, rather than the URI or user identity asserted at the originating S-CSCF.

Figure 3:
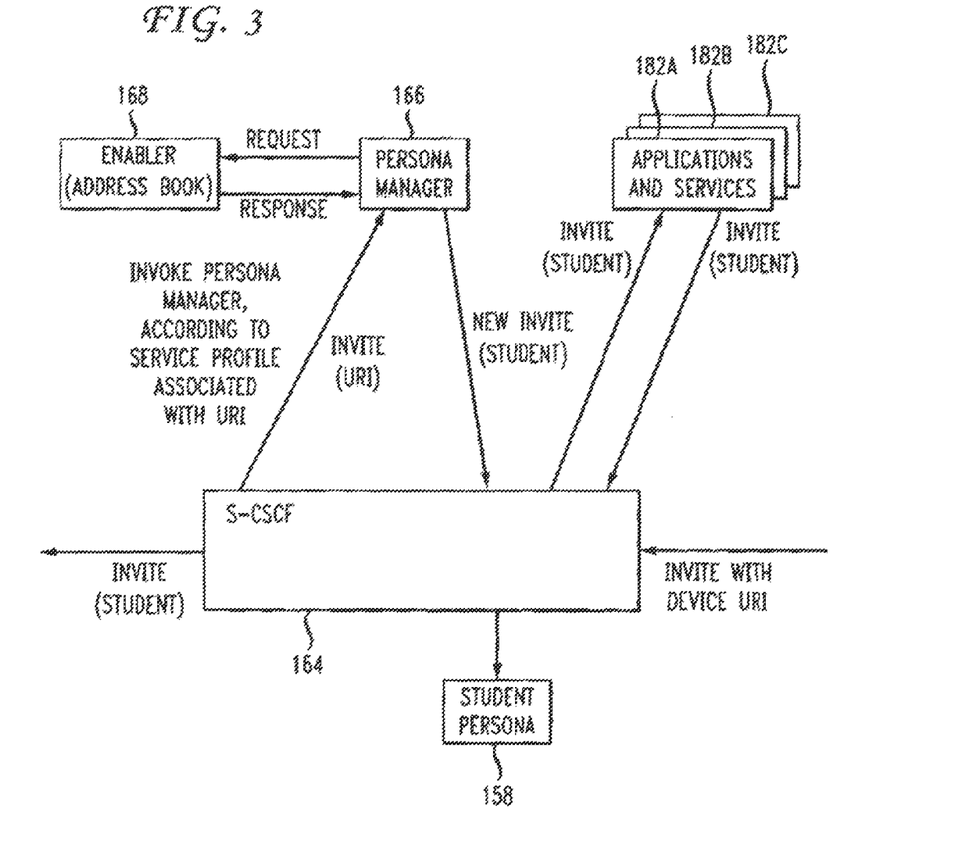

FIG. 3 is a diagram 300 illustrating an example of call origination and persona selection as performed by the S-CSCF 164 and persona manager 166 when invoked in order to receive a call. An invite arrives at the S-CSCF 164 with a public user identity in the request URI that has been chosen by the calling party. In this example, a default PUID associated with the URI is used. There are a number of reasons why a default PUID may be used. For example, the user receiving the invite may be new to the service, so that all of the user's current contacts may use the phone numbers they previously used, not those that would invoke the persona associated with the PUID. As another alternative, the user may prefer a single number as an address. Such a practice is convenient for users, and automatic selection of personas by the persona manager 166 helps allow the user to be assigned the correct persona for an incoming call, even if all calls are directed to the same PUID. As an additional alternative, the user may desire that the persona manager 166 check whether the caller is supposed to be using the PUID in the request URI so that it can be changed if necessary.

In the present exemplary case, three exemplary personas are available to be applied when the S-CSCF 164 receives the invite. These are the student persona, the work persona, and the default persona. Because the Request URI of the invite includes the PUID pointing to the default service profile, the S-CSCF 164 begins processing the default service profile.

The service profiles consist of iFCs. The highest priority iFC of the default service profile is executed first. If it does not have a trigger point or if the trigger point evaluates to TRUE, the S-CSCF 164 sends the invite to the function designated by the initial filter criteria, in this case, the persona manager 166.

When the persona manager 166 receives the invite, it must determine how the request URI is to be managed. Because the invite is directed to the receiving user, the persona manager 166 recognizes that to change the Service Profile processed, a change will be made to the PUID in the Request URI.

In the present exemplary case, the persona manager 166 invokes the student persona by identifying the calling party as a fellow student. This identification is accomplished because the exemplary persona manager 166 maintains a rule that if the asserted identity of the calling party included in the invite appears on a list maintained for use by the persona manager 166, then the persona manager will change the request URI to a particular PUID or other identifier associated with the list. In this example, the address book 168 includes information necessary to maintain a student list, which is examined to determine if the PUID in the request URI command appears in the student list. In this case, the PUID does appear. Therefore, the calling party is determined to be a fellow student and the receiving user's student PUID is used. To take another example, if the asserted identity of the originating party had appeared on a list associated with the work persona and including names of work colleagues, the persona manager 166 will change the Request URI command to the work PUID. If the caller PUID had appeared on neither list, the persona manager 166 would add the asserted PUID to a third list called unassigned callers and will not change the request URI. This examination could also be accomplished using attributes assigned to the contacts in the Address Book indicating the preferred persona rather than with a list.

As noted above, in the present exemplary case, the invite is from a student and the PUID of the originating party appears on the student list. The persona manager 166 therefore changes the Request URI header of the invite to an invite including the receiving user's student PUID. The persona manager 166 then sends the invite to the S-CSCF from which the persona manager 166 received the invite, which is the S-CSCF 164. The persona manager 166 has acted as a SIP back to back user agent.

Because the request URI has changed, the S-CSCF 164 treats the returned invite as a new invite. First, it checks whether the invite is to be processed by itself. Since both the default PUID which was used to originally route the invite to the S-CSCF 164 and the student PUID in the request URI sent by the persona manager 166 belong to the same user profile, the same S-CSCF, namely, the S-CSCF 164, is used to process it.

Because the new invite includes the student PUID as the request URI, the S-CSCF 164 will chooses the student persona. It then, as appropriate, sends the invite to the various applications invoked by iFCs in the student persona. When the S-CSCF 164 has completed processing the student persona, it sends the invite to the appropriate destination associated with the student PUID in the user's profile.

Figure 4:
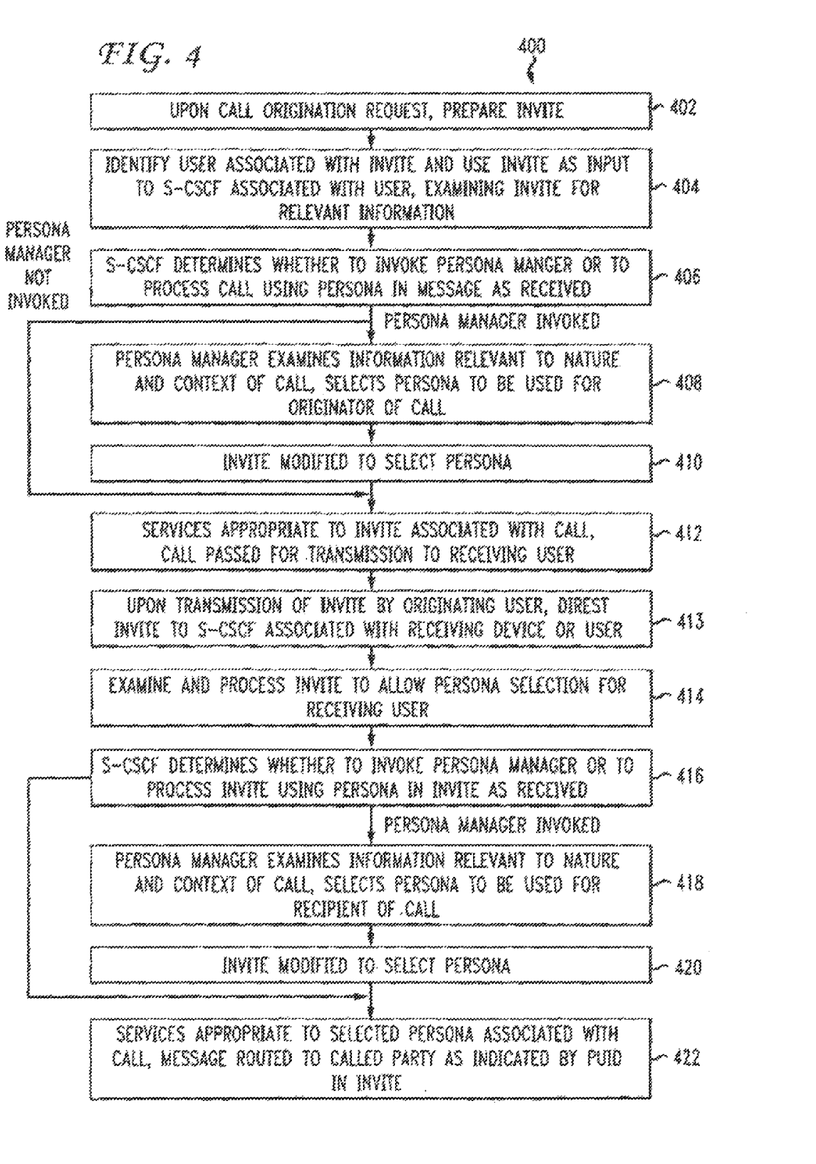
FIG. 4 illustrates a process of communication session initiation and management according to an aspect of the present invention.

FIG. 4 illustrates a process 400 of communication session establishment according to an aspect of the present invention. At step 402, upon receiving a request from a user to begin a communication session, or call, a session initiation request or invite, is prepared. The invite typically takes the form of a request to initiate a session with a specified user, suitably identified by a Public User ID. In cases in which resources and devices exist that are not associated with PUIDs, these resources and devices may be specified with alternative forms of URI. The invite also includes information identifying the initiator of the request. This information may include a URI of a device, a PUID of a user, or both. At step 404, the user associated with the invite is identified and the invite is used as an input to a serving call session control function (S-CSCF) associated with the user. The S-CSCF examines the information contained in the invite to obtain relevant information to indicate the persona to be used in initiating the call. This information may include the user identification, specific user selection, device being used, user or device to whom or to which the call is directed, or other relevant information. At step 406, the S-CSCF determines whether the persona manager is to be invoked to select a persona or whether the persona indicated in the invite is to be employed without the persona manager being invoked. If the pesona manager is to be invoked, the process proceeds to step 408. If the persona manager is not invoked, the process skips to step 412.

At step 408, the persona manager is invoked and obtains additional relevant information relating to the nature and context of the call. The information from the invite, as well as the additional information, is used by the persona manager to select a persona to be employed by the originator of the call, with the selected persona determining services to be associated with the call. The selection suitably includes operation of rules chosen to provide for an appropriate selection, such as choosing between a work or home persona based on time of day, location, or other relevant information, or based on the identity of the user being called, such as identifying the user as a work colleague, fellow student, or social acquaintance.

At step 410, the invite is modified as appropriate to select the persona. At step 412, appropriate services are associated with the call, depending on the persona associated with the call, whether this is the persona associated with the original invite or the persona selected by the persona manager, and the invite is passed for transmission to a receiving user.

The following steps 413-422 deal with handling of a call directed to a receiving user and selection of a persona to be asserted for the receiving user. Steps 413-422 will not typically proceed sequentially after steps 402-412, but will be performed when appropriate, based on events as they occur.

At step 413, upon transmission of an invite by an originating user, the invite is directed to an S-CSCF associated with a receiving device or user. At step 414, the invite is examined and processed to identify information allowing selection of a persona to be associated with the receiving user in the call. At step 416, the C-SCSF determines whether a persona manager is to be invoked or the persona in the invite as received is to be used, without invoking the persona manager. If the persona manager is to be invoked, the process proceeds to step 418. If the persona manager is not invoked, the process skips to step 422.

At step 418, the persona manager is invoked and obtains additional relevant information relating to the nature and context of the call. The information from the invite, as well as the additional information, is used by the persona manager to select a persona to be employed by the originator of the call, with the selected persona determining services to be associated with the call. At step 420, the invite is modified to select the persona. At step 422, appropriate services are associated with the call depending on the persona associated with the call, whether this is the persona associated with the invite as received or the persona selected by the persona manager, and the invite is passed for transmission to a receiving user.

While the present invention is disclosed in the context of a presently preferred embodiment, it will be recognized that a wide variety of implementations may be employed by persons of ordinary skill in the art consistent with the above discussion and the claims which follow below.

What is claimed is:

1. A device, comprising:
    a memory to store computer instructions; and
    a processor coupled to the memory, wherein the processor, responsive to executing the computer instructions, performs operations comprising:

receiving an invite from an originating user device requesting a communication session with a receiving user device;

determining, from the invite, identification information comprising a uniform resource identifier to identify a network address of the originating user device and a first public user identifier of the originating user device;

selecting a receiving user persona for the originating user device based on the identification information to identify services to be invoked for the originating user device during the communication session;

modifying the invite by substituting a second public user identifier for the first public user identifier according to the receiving user persona to thereby generate a modified invite, wherein the modified invite invokes a first set of services to be used in the communication session and wherein the first set of services differ from a second set of services associated with the invite; and transmitting the modified invite to a session termination server to complete the communication session.

2. The device of claim 1, wherein the selecting of the receiving user persona is further based on the first public user identifier and a context of the communication session.

3. The device of claim 2, wherein the context of the communication session comprises a relationship between an originating user that is associated with the originating user device and a receiving user that is associated with the receiving user device.

4. The device of claim 2, wherein the context of the communication session comprises activities associated to be carried out by an originating user that is associated with the originating user device during the communication session.

5. The device of claim 1, wherein the first set of services and the second set of services comprise a plurality of services that communicate information during the communication session using one of a communication format and a communication protocol.

6. The device of claim 1, wherein the operations further comprise generating a communication request including the first public user identifier.

7. The device of claim 1, wherein the operations further comprise performing a serving-call session control function for processing the modified invite.

8. The device of claim 1, wherein the operations further comprise:

receiving identification information for a receiving user associated with the receiving user device, wherein the identification information is associated with a request for a second communication session;

selecting a second receiving use persona to be used by the receiving user device;

modifying the modified invite by substituting a third public user identifier for the second public user identifier according to the receiving user persona to thereby generate a second modified invite; and transmitting the second modified invite to a session termination server to complete the second communication session.

9. The device of claim 8, wherein the selecting of the second receiving persona is based on information relevant to a context of the receiving user device.

10. The device of claim 9, wherein the information relevant to the context of the second communication session comprises characteristics of the second communication session relevant to determining activities of the receiving user device being carried on by the second communication session.

11. The device of claim 10, wherein the characteristics of the second communication session relevant to determining the activities of the receiving user comprise an identity of an originating user that is associated with the originating user device.

12. The device of claim 9, wherein the operations further comprise generating a new session origination request asserting a different identifier for the receiving user of the receiving user device.

13. A computer-readable storage device comprising computer instructions that, when executed by a processor, cause the processor to perform operations comprising:

receiving an invite from an originating user device requesting a communication session with a receiving user device, wherein the invite comprises a uniform resource identifier to identify a network address of the originating user device and a first public user identifier of the originating user device;

selecting a receiving user persona for the originating user device based on the uniform resource identifier and the first public user identifier, wherein the receiving user persona identifies services to be invoked for the originating user device during the communication session;

modifying the invite by substituting a second public user identifier for the first public user identifier according to the receiving user persona to thereby generate a modified invite, wherein the modified invite invokes a first set of services to be used in the communication session and wherein the first set of services differ from a second set of services associated with the invite; and transmitting the modified invite to a session termination server to complete the communication session.

14. The computer-readable storage device of claim 13, wherein selecting the receiving user persona further comprises examining and using information relating to a context of the communication session in selecting the receiving user persona.

15. The computer-readable storage device of claim 14, wherein examining and using information relating to the context of the communication session comprises examining characteristics of the communication session that are relevant to determining activities of an originating user of the originating user device being carried on by the communication session.

16. The computer-readable storage device of claim 13, wherein the processor further performs operations comprising creating a communication request comprising an identifier for the originating user device, wherein the identifier is associated with the receiving user persona.

17. The computer-readable storage device of claim 13, wherein the first public user identifier corresponds to information about a location of the originating user device, a time of day, an originating user associated with the originating user device, a receiving user associated with the originating user device, and a set of profiles for one of the originating user and the receiving user.

18. The computer-readable storage device of claim 13, wherein the processor further performs operations comprising determining a relationship between the originating user device and the receiving user device, wherein selecting the receiving user persona for the receiving user device is based on the relationship.

* * * * *